United States Patent Office 2,953,499
Patented Sept. 20, 1960

2,953,499

PROCESS FOR PRODUCING L-GLUTAMIC ACID FROM HARDLY SOLUBLE AMINO-ACID

Hideo Katagiri, Kyoto City, and Tatsurokuro Tochikura, Otokuni-gun, Japan, assignors to Ajinomoto Co., Inc., Tokyo, Japan, a corporation of Japan No Drawing. Filed Feb. 8, 1957, Ser. No. 638,905

Claims priority, application Japan Apr. 19, 1956

3 Claims. (Cl. 195—47)

This invention relates to processes for producing L-glutamic acid.

The invention contemplates a process for producing L-glutamic acid wherein L-glutamic acid is produced from an almost insoluble amino-acid and α-keto-glutaric acid by utilizing enzymes of microorganisms. Heretofore, no practical method has been known for producing L-glutamic acid and various keto-acids, other than α-keto-glutaric acid, simultaneously from amino-acids other than L-glutamic acid and α-keto-glutaric acid.

According to this invention, L-glutamic acid and various keto-acids other than α-keto-glutaric acid can be produced from almost insoluble amino-acids such as leucine, iso-leucine, tyrosine, phenylalanine, valine, methionine, which are industrial by-products and are obtained at low cost, and calcium salt or sodium salt of α-keto-glutaric acid at a pH of 7.0–8.5, at a temperature of 30–45° C., in the presence of an antiseptic, by the action of enzymes of microorganisms in a cultivation medium obtained under aerobic conditions.

Amino-acids such as leucine, iso-leucine, phenylalanine, tyrosine, valine, methionine are contained in various proteins as their structural amino-acids, and they are produced abundantly as by-products in the commercial production of L-glutamic acid by hydrolysis of proteins. They have relatively low solubility in water and are separated as crystals abundantly in the process of production of L-glutamic acid by hydrolysis. However, these almost insoluble amino-acids have not been fully utilized heretofore and are generally used only as manure.

α-Keto-glutaric acid has been recently produced abundantly from sugars by fermentation.

It has been found according to the invention, that L-glutamic acid and various keto-acids other than α-keto-glutaric acid can be produced from amino-acids such as leucine, iso-leucine, tyrosine, phenylalanine, valine and methionine and α-keto-glutaric acid. For example, microorganisms of the genus Flavobacterium such as *Flavobacterium breve*, microorganisms of the genus Achromobacter such as *Achromobacter liquefaciens*, microorganisms of the genus Alcaligenes such as *Alcaligenes faecalis*, microorganisms of the genus Serratia such as *Serratia marcescens* are capable of producing L-glutamic acid and α-keto-iso-caproic acid from leucine and α-keto-glutaric acid and also of producing L-glutamic acid and α-keto-β-methyl-valeric acid from iso-leucine and α-keto-glutaric acid.

The microorganisms above mentioned are very slow to propagate in medium under static condition, but it has been found the rate of growth and consequently the production of enzyme can be greatly raised by agitation or submerged cultivation under aerobic condition. It has been further ascertained that the cultivation medium, as it is, can be used as the source of enzyme without separating microorganisms from the aerobic cultivation medium. For instance, 100 ml. of aerobic cultivation medium maintained at temperature of 25–38° C. for 10–70 hours may be able to produce by synthesis 5–20 g. of L-glutamic acid and a substantially equimolecular amount of keto-acid of various kinds, according to the materials used, by reaction for 5–70 hours at a temperature of 30–45° C.

L-glutamic acid is relatively easily decomposed by living cells (fresh cells), but by adding a small amount of toxic agent such as toluene, this tendency of decomposition of L-glutamic acid by living cells can be effectively prevented. The addition of the toxic agent has also an advantage of preventing an invasion of miscellaneous harmful organisms. It has been ascertained by the inventors that the enzyme active for the synthesis of L-glutamic acid and various keto-acids is substantially not destroyed at all by the toxic agent.

The addition of the toxic agent has a further significant and practical advantage in that it entirely eliminates the necessity of troublesome and complicated operations such as drying, dehydration by solvent (e.g. acetone treatment) freezing ultrasonic treatment and the like.

The enzymes which are known to be active for the decomposition of L-glutamic acid, namely the enzymes active for the decarboxylation of glutamic-acid, are active when the liquid is weakly acid while the enzymes active for synthesis of L-glutamic acid and keto-acid of various kinds exhibit high activity in the range of pH of from 7.0 to 8.0. The solubility of amino-acids such as leucine, iso-leucine, etc. is higher in the weak alkaline range than in the weak acid range. Accordingly, it has been ascertained that the range of pH of about 7.0–8.0 is most appropriate for the process. The value of pH generally varies as the enzyme reaction proceeds and therefore the so-called buffer solution is important. However, it has been established that there is no necessity of adding a special buffer solution such as phosphate solution to the reaction liquid in the synthesis reaction of L-glutamic acid and keto-acid of various kinds of this invention. Inorganic material such as phosphoric acid which exhibits an important action in biological reactions is also not necessarily added to the enzyme reaction liquid. The adjustment of pH may be completely attained with NaOH, $Na_2CO_3$, $NaHCO_3$ and the like.

In the commercial production of L-glutamic acid by hydrolysis of proteins, it has been found that any one or the mixture of almost insoluble amino-acids which are obtainable easily and abundantly as described before is suitable as the starting material. It is matter of significant practical value that a mixture of amino-acids can be advantageously used as a starting material.

Amino-acids obtained as by-products in the production of L-glutamic acid contain generally a substantial amount of common salt. However, since most of the microorganisms mentioned above have good resistance to common salt, the reaction is not affected adversely in any degree by the presence of common salt in the reaction liquid. Since the optimum propagation temperature of most of microorganisms mentioned before is 25–38° C., it is necessary to cultivate the enzymes of the microorganisms at the temperature of this range. It is, however, preferable to use a relatively high temperature of from 30° C. to 45° C. for the enzyme reaction for the synthesis of L-glutamic acid and keto-acids other than α-keto-glutaric acid employing the cultivation medium of microorganisms as the source of enzyme in order to raise the reaction speed.

The microorganisms described above are found widely in sea water, water, air, soil, various organic materials and are generally known as harmful microorganisms pertaining to putrefaction. However, it has now been found that they can be utilized as useful microorganisms by this invention for the new process for the commercial production of L-glutamic acid and various keto-acids, which enables producing valuable L-glutamic acid from almost insoluble amino-acids such as leucine, iso-leucine, tyrosine, phenylalanine, valine, methionine, etc. which have had little use heretofore.

The reaction liquid, after the enzyme reaction, is made weakly acid and then is subjected to heating in order to coagulate the microorganisms and the enzyme protein. The pH of the liquid is adjusted to about 6.0 and the remaining almost insoluble amino-acid which has been precipitated by concentration under reduced pressure is removed. A decolorization operation may be exercised on this occasion, if desired. Then the pH of the liquid is adjusted to 3.0–3.1 (near the isoelectric point of L-glutamic acid) and the liquid is concentrated under reduced pressure by any conventional method to crystallize out L-glutamic acid, which is then separated as crystals. The separation of keto-acid may be effected by distillation under reduced pressure after the liquid is made strongly acid.

In order to facilitate an understanding of this invention, a few embodiments of this invention will be described hereunder for the purpose of illustration.

Example 1

An almost neutral medium comprising 2.6–4.0% peptone, 1% glucose, 0.2–0.5% NaCl, 0.1–0.2% $K_2HPO_4$, and 0.05–0.01% $MgSO_4$ is inoculated with *Flavobacterium fuscum*, and is cultivated at 22–35° C. with shaking. To the cultivated medium are added 1–8% of a mixture of almost insoluble amino-acids (comprising leucine as the major ingredient and containing iso-leucine, phenylalanine, and methionine) and 0.5–8% of calcium salt or sodium salt of α-keto-glutaric acid, and the reaction is carried out under a neutral or slightly alkaline condition at 30–45° C. in the presence of toluene for a period of from 2 hours to 4 days. The solution may be agitated if necessary. By this operation, about 60–100% of α-keto-glutaric acid may be converted to L-glutamic acid by synthesis. After making the reaction liquor weakly acid, settled materials produced by heating are removed. Then the pH of the liquor is adjusted to about 6.0 and concentrated under reduced pressure. The remaining almost insoluble amino-acids precipitate from the liquor and are removed. The filtrate is adjusted to pH 3.0–3.1 and is concentrated again according to a conventional method under reduced pressure to crystallize L-glutamic acid. L-glutamic acid is separated and the mother liquor is made strongly acid and is distilled under reduced pressure to distill keto-acid.

L-glutamic acid and keto-acid produced are as follows:

Starting materials:
    Mixture of amino-acids _____ g__ 5.0
    α-Keto-glutaric acid _____ g__ 2.7
    *F. fuscum* cultivation medium _____ ml__ 50
    Water for making the total volume to 300 ml.
Reaction: 24 hours at 37° C.
Products:
    L-glutamic acid _____ g__ 1.95
    α-Keto-isocapric acid _____ g__ 1.58

Example 2

Similar experiment as Example 1 is carried out by employing *Flavobacterium breve* and the following results are obtained.

Starting materials:
    Mixture of amino-acids _____ g__ 3.0
    α-Keto-glutaric acid _____ g__ 2.2
    *F. breve* cultivation medium _____ ml__ 100
Reaction:
    40 hours at 35° C.
    50 hours at 35° C.
Production of glutamic acid and its yield:
    1.3 g. (59%)
    1.7 g. (77%)

Example 3

Similar experiment as Example 1 is carried out with *Achromobacter liquefaciens* employing L-phenylalanine and α-keto-glutaric acid as starting materials. The results of the experiment show 100% yield in respect of both L-glutamic acid and phenyl pyruvic acid as described in the following:

Starting materials:
    L-phenylalanine _____ g__ 1.6
    α-keto-glutaric acid _____ g__ 1.0
    *A. liquefaciens* cultivation medium _____ ml__ 100
Reaction: 48 hours at 35° C.
Products:
    L-glutamic acid _____ g__ 1.0
    Phenyl pyruvic acid _____ g__ 1.1

What is claimed is:

1. A process for producing L-glutamic acid which comprises inoculating a medium comprising a carbon source, a nitrogen source and other nutrients with a strain of *Flavobacterium fuscum* and cultivating said bacteria at 22–38° C. under aerobic condition to grow and propagate the bacteria thereby obtaining transaminase activity effective to cause transfer of an amino group from an amino acid to alpha-ketoglutaric acid, thereafter adding to said medium alpha-ketoglutaric acid, a mixture of amino acids containing leucine as its main component and a small amount of toluene and thereafter maintaining the medium at a pH of from 7.0 to 8.0 and at a temperature of from 30° C. to 45° C. for a period of from 2 hours to 4 days to produce L-glutamic acid, and recovering L-glutamic acid accumulated in the medium.

2. A process according to claim 1 wherein said mixture of amino acids contains common salt.

3. A process for producing L-glutamic acid which comprises inoculating a medium comprising carbon source, nitrogen source and other nutrients with a microorganism selected from the group consisting of *Flavobacterium fuscum*, *Flavobacterium breve* and *Achromobacter liquefaciens*, and cultivating said bacteria at 22–38° C. under aerobic conditions to grow and propagate the bacteria thereby obtaining transaminase activity effective to cause transfer of an amino group from an amino acid to alpha-ketoglutaric acid, thereafter adding to said medium alpha-ketoglutaric acid, at least one amino acid from the group consisting of leucine, isoleucine, tyrosine, phenylalanine, valine and methionine, and a small amount of toluene and thereafter maintaining the medium at a pH of from 7.0 to 8.0 and at a temperature of from 30° C. to 45° C. for a period of from 2 hours to 4 days to produce L-glutamic acid, and recovering L-glutamic acid accumulated in the medium.

References Cited in the file of this patent

UNITED STATES PATENTS

| | | |
|---|---|---|
| 2,749,279 | Smythe et al. | June 5, 1956 |
| 2,776,926 | Sharpe et al. | Jan. 8, 1957 |
| 2,789,939 | Kita | Apr. 23, 1957 |

OTHER REFERENCES

Gale: Chemistry and Industry, February 28, 1948, pp. 131 and 132.

Sumner et al.: The Enzymes, vol. 1, part 2, 1951, pub. by Academic Press Inc. (New York), pp. 1049 and 1050.

Cammarata et al. and Feldman et al.: Articles, "J. Biol. Chem.," vol. 187 (1951), pp. 439 to 442 and pp. 821 to 824.

Chemistry and Methods of Enzymes, by Sumner et al., Academic Press Inc., New York (1953), page 346 relied on.